US012698373B2

(12) United States Patent
Bertino et al.

(10) Patent No.: US 12,698,373 B2
(45) Date of Patent: Aug. 4, 2026

(54) FIRE-RESISTANT, FIRE RETARDANT AND/OR THERMAL INSULATION

(71) Applicant: VIRGINIA COMMONWEALTH UNIVERSITY, Richmond, VA (US)

(72) Inventors: Massimo Bertino, Glen Allen, VA (US); Tristan Moon, Richmond, VA (US); Dustin Clifford, Richmond, VA (US); Jonathan Ko, West Bethesda, MD (US); Gordon Waller, Washington, DC (US)

(73) Assignee: VIRGINIA COMMONWEALTH UNIVERSITY, Richmond, VA (US)

( * ) Notice: Subject to any disclaimer, the term of this patent is extended or adjusted under 35 U.S.C. 154(b) by 517 days.

(21) Appl. No.: 18/376,564

(22) Filed: Oct. 4, 2023

(65) Prior Publication Data

US 2024/0124670 A1 Apr. 18, 2024

Related U.S. Application Data

(60) Provisional application No. 63/526,487, filed on Jul. 13, 2023, provisional application No. 63/415,386, filed on Oct. 12, 2022.

(51) Int. Cl.
| | |
|---|---|
| *C08J 9/00* | (2006.01) |
| *C08J 9/224* | (2006.01) |
| *C08J 9/28* | (2006.01) |
| *C09K 5/14* | (2006.01) |
| *F16L 59/02* | (2006.01) |

(52) U.S. Cl.
CPC ............. *C08J 9/0009* (2013.01); *C08J 9/224* (2013.01); *C08J 9/286* (2013.01); *C09K 5/14* (2013.01); *F16L 59/028* (2013.01); *C08J 2201/0502* (2013.01); *C08J 2205/026* (2013.01); *C08J 2205/05* (2013.01); *C08J 2207/00* (2013.01)

(58) Field of Classification Search
CPC . C08J 9/0009; C08J 9/224; C08J 9/286; C08J 2201/0502; C08J 2205/026; C08J 2205/05; C08J 2207/00; C09K 5/14; F16L 59/028
See application file for complete search history.

(56) References Cited

U.S. PATENT DOCUMENTS 6,765,031 B2    7/2004   Salyer et al.
2022/0177765 A1*  6/2022   Trifu ...................... C08J 9/0023

* cited by examiner

*Primary Examiner* — K. Boyle
(74) *Attorney, Agent, or Firm* — WCF IP

(57) ABSTRACT

An open cell foam, and particularly aerogels or other foams, having an inorganic, hydraded phase change material (PCM) embedded within pores or cells or a network within the foam have fire retardant, fire resistant and thermal insulating properties. These composite materials are preferably mono-lithic in character, and are mechanically robust allowing for example the attachment of nails or screws. With the PCM distributed throughout the open cell foam, the composite material has a wide array of applications including providing thermal, fire resistant, and fire retardant uses in battery containers, in automotives and other vehicles, etc.

4 Claims, 6 Drawing Sheets

FIG. 1A                    FIG. 1B

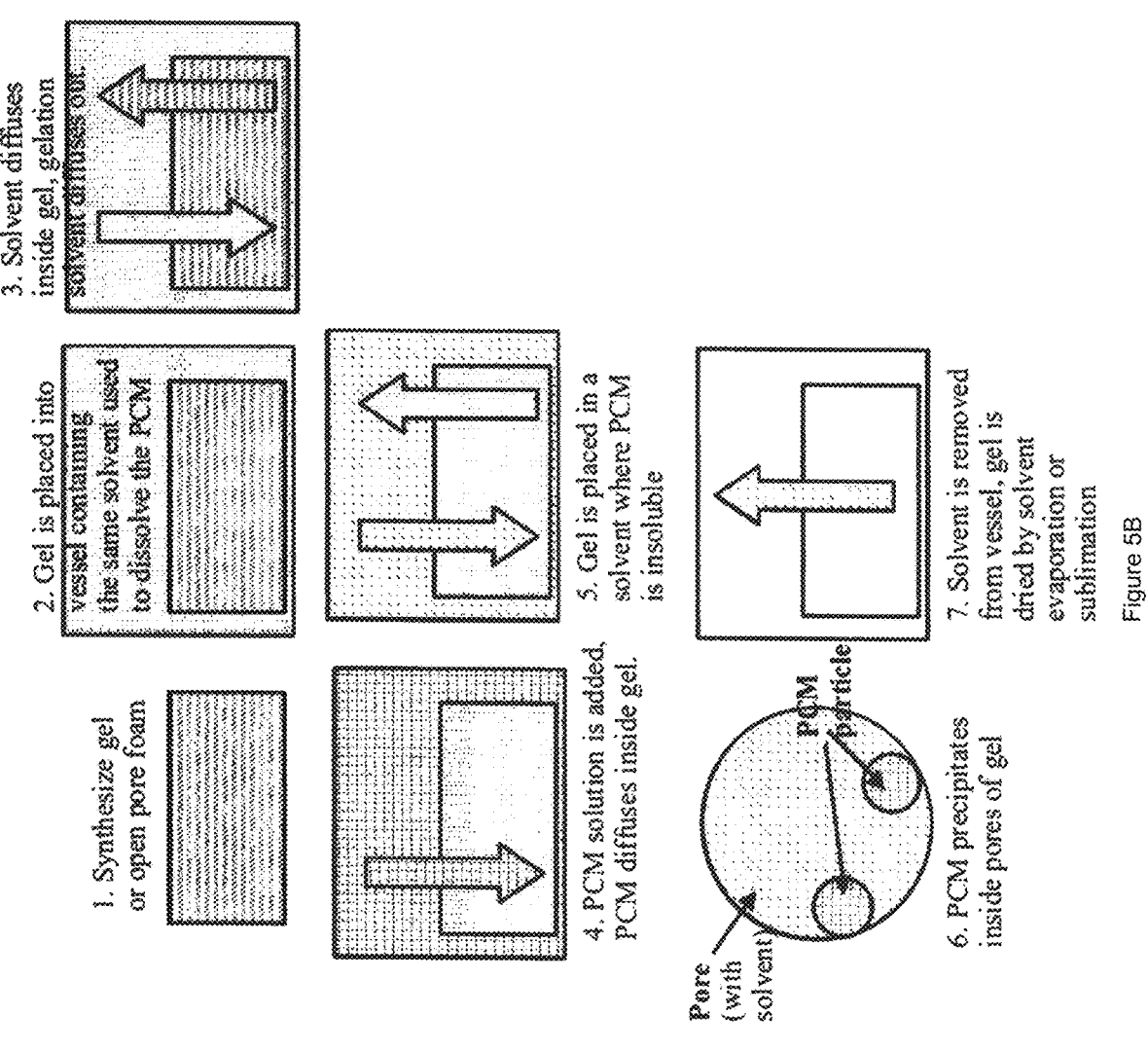

1. Synthesize gel or open pore foam

2. Gel is placed into vessel containing the same solvent used to dissolve the PCM 3. Solvent diffuses inside gel, gelation solvent diffuses out.

4. PCM solution is added, PCM diffuses inside gel.

5. Gel is placed in a solvent where PCM is insoluble

6. PCM precipitates inside pores of gel

7. Solvent is removed from vessel, gel is dried by solvent evaporation or sublimation Pore (with solvent)

PCM Particle

Figure 5B

FIRE-RESISTANT, FIRE RETARDANT AND/OR THERMAL INSULATION

CROSS-REFERENCE TO RELATED APPLICATIONS

This application claims benefit of U.S. provisional patent applications 63/415,386 filed Oct. 12, 2022 and 63/526,487 filed Jul. 13, 2023.

STATEMENT OF FEDERALLY SPONSORED RESEARCH AND DEVELOPMENT

This invention was made with government support under grant numbers DE-EE0008676 & 693JK3-20-C-000007 awarded by the Department of Energy (DOE) and the Department of Transportation (DOT). The government has certain rights in the invention.

BACKGROUND OF THE INVENTION

Technical Field

The invention generally relates to thermally insulating, monolithic, mechanically robust, fire resistant, fire retardant and thermally insulating materials. In particular, the invention provides thermally insulating, monolithic, mechanically robust fire retardant and/or fireproofing materials made from an open cell foam material infiltrated with a phase change material (PCM) that is a hydrated inorganic material.

Description of Related Art

Fireproofing and fire-retardant materials are used for a variety of purposes, ranging from home construction to battery packs. With respect to the former, the prevention and/or containment of fire or any origin of fire (e.g., an electrical fire caused by faulty wiring) is of high importance to minimize damage and protect human from injury. With respect to the latter, various batteries typified by lithium batteries may have defects caused, e.g., by an internal short-circuit, leading to ignition and/or smoking and thermal runaway within and adjacent to the battery. In order to minimize damages ascribable to such causes, there is a need to prevent the heat of an unintended fire or an abnormally high temperature from being transferred to its surroundings. To that end, a variety of fire (flame) retardant/resistant and/or fireproof materials have been developed.

Several polymeric thermal insulators are available which incorporate fire-retardancy in one form or another. However, few (if any) organic thermal insulators do not ignite when exposed to radiant powers of 100 kW/m$^2$. Inorganic-based insulators, such as glass wool, or silica aerogels, have low (if any) flammability, but they are typically mechanically weak and require encapsulation.

PCM composites have been used and commercialized for the prevention of battery runaway events. However, the commercial PCM composites are based on organic PCMs, and are therefore flammable. Further, these composites do not possess any significant thermal insulating capability.

Fire protection is sometimes provided in construction and/or transportation applications by intumescent materials. These materials form thermally insulating foams when heated, providing a degree of protection of the underlying structure in case of fire. However, intumescent materials are not good thermal insulators unless the foaming process is triggered by a fire. In addition, they do not contain a heat-absorbing material.

There is a need in the art for improved materials which are thermally insulating, monolithic, mechanically robust and fireproof, and yet may be cost-effective to produce. Further, there is a need for such materials that do not emit toxic fumes upon being exposed to high temperatures or flames. In particular, there has been a long-recognized need for rigid thermal insulation materials with good fire resistance and mechanical strength

SUMMARY OF THE INVENTION

Disclosed herein are compositions comprising a rigid, porous material infiltrated with at least one inorganic phase change material (PCM). In some aspects, the porous material is an open cell foam having a plurality of pores and the PCM material is contained within the pores. The resulting materials are thermally insulating ($<0.050$ W·m$^{-1}$·K$^{-1}$ at ambient temperature and pressure (e.g. 37 C and 1 atm)), rigid, monolithic, mechanically robust, fire resistant and fire retardant, and are capable of better absorption of thermal energy due to the PCM component. In addition, the compositions can be made using a cost-effective ambient drying technique.

Other features and advantages of the present invention will be set forth in the description of invention that follows. The invention will be realized and attained by the compositions and methods particularly pointed out in the written description and claims hereof.

In a particular embodiment, the invention is directed to a material which is composed of an open cell foam and a PCM distributed within pores or cells of the open cell foam. The open cell foam is preferably an open cell aerogel. The open cell foam has a network of open pores or cells (the terms being used interchangeably and describing the same thing) with at least some interior pores or cells and at least some surface pores or cells, where the network of pores or cells is accessible by a gas or liquid through at least some surface pores or cells. The interior pores or cells are within an interior of the open cell foam and the surface pores are positioned at one or more external surfaces of the open cell foam (e.g., top, bottom, left or right side, top or bottom end, etc., it being recognized that the foam can take any desired shape (e.g., cubic, cylinder, irregular, etc.)). At least some interior pores or cells and at least some surface pores or cells include pore or cell walls defining a pore or cell. The PCM is deposited on portions of at least some of the pore or cell walls of the surface pores or cells and the interior pores or cells. The size of the pores or cells can be wide ranging (1 nm to 1 mm). The PCM may be present in a small percentage of the pores or cells (e.g., 10%) or a large percentage of the pores or cells (e.g., 100%), and the PCM may completely fill some or all of the pores or cells, or most preferably, the PCM will merely be present on the walls of some or all of the pores or cells (e.g., the PCM will fill 1-25% of the volume of the pores or cells). The types of PCM materials used can be wide ranging including inorganic PCMs such as $MgSO_4$, $MgCl_2$, $CaCl_2$, $FeCl_2$, $Fe_2SO_4$, $Na_2HPO_4$, $Na_2SO_4$, etc., and is preferably hydrated (e.g., $CaCl_2 \cdot 6H_2O$, $MgCl_2 \cdot 6H_2O$, $FeCl_2 \cdot 6H_2O$, $Na_2HPO_4 \cdot 12H_2O$, $Na_2SO_4 \cdot 10H_2O$, $Ba(OH)_2 \cdot 8H_2O$, etc.). Various fillers may also be included in the open cell foam including loose fiberglass, wood flour, cellulose fibers, metal nanoparticles or metal fibers, carbon fibers, graphene, glass microspheres, polyimide fibers, carbon black, and graphite, and combinations thereof.

In another embodiment of the invention, the aforementioned material is used as a thermal insulator (e.g., for batteries, portions of vehicles or machinery exposed to heat, etc.). The material would be applied or placed on a surface where thermal insulation is desired and would have the advantage of providing the surface with thermal protection, as the thermal conductivity of the material is less than 0.2 $W \cdot m^{-1} \cdot K^{-1}$ at ambient temperature (e.g., 37 C) and pressure (e.g., 1 atm).

In yet another embodiment of the invention, the aforementioned material is used for improving fire resistance or fire retardancy for a material or device. The aforementioned materials can be used prevent fires from starting and/or limit their spread. Depending on the formulation, the aforementioned materials have the advantage that they do not ignite and do not drip molten material under stringent testing conditions. In many applications, the materials will provide both thermal protection as well as fire resistant or fire retardant protection.

In still another embodiment of the invention, the aforementioned material is made by providing an open cell foam with a network of connected pores of an open cell foam with a solution comprising a solvent and a phase change material, and removing the solvent from the foam to leave the PCM on at least portions of pore or cell walls of a plurality of pores or cells of the network of connected pores and materials. For example, the open cell foam can be produced by reacting resorcinol and formaldehyde (or other suitable aerogel precursors) together in a first solvent with a catalyst to form an aerogel which comprises a network of open cells or pores with some internal pores or cells within the aerogel and some surface pores or cells on one or more surfaces of the aerogel, wherein at least some internal pores are connected to some surface pores by pore openings in each of the pores. The open cell foam can then be infused with, drenched in, sprayed with, or otherwise exposed to a solvent or solvent mixture which includes one or more PCMs (e.g., a single PCM material or a blend of two or more different PCMs). Once the PCM or PCM blend is infiltrated or otherwise dispersed throughout the network of interconnected pores or cells, the solvent may be removed by evaporation, evacuation or other means to leave the PCM or PCM blend deposited on (e.g., by precipitation or other means) the walls of at least some of and preferably most of the cells or pores.

BRIEF DESCRIPTION OF THE DRAWINGS

FIGS. 1A and B. SEM of aerogels without PCM. A, first magnification; B, higher magnification.

DETAILED DESCRIPTION

Figure 2A:
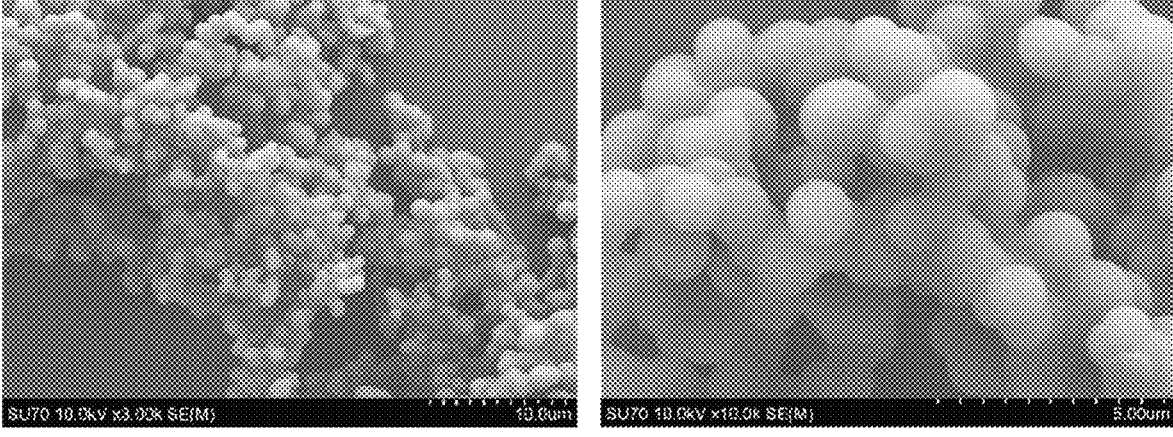
FIGS. 2A and B. SEM of aerogels and $MgSO_4$ as the PCM. A, first magnification; B, second higher magnification.

An open cell foam material with at least one type of inorganic phase change material (PCM) infiltrated or otherwise distributed therein, within pores of the open cell foam material, provides for a composite having robust fire resistant, fire retardant and/or thermally insulative properties. The materials may be used for fireproofing or protection against the spread of fire. In case of fire, a conventional thermal insulator transmits some of the heat, which leads to ignition and damage of structures behind the thermal insulator. In contrast, when exposed to high temperatures, the PCM-based materials disclosed herein remove heat when their transition temperature is reached and therefore offer superior protection against fire and high temperatures. In some embodiments, the PCM in the composites absorbs energy by releasing water associated with metal salts. The freed water evaporates and makes an additional contribution to cooling. The composite materials are thus especially suited to prevent runaway events, e.g., when used to insulate battery packs, etc.

In addition, the composite materials are advantageously monolithic, can be cut, and nails and screws can be inserted therein, making them also advantageously suitable for use in the construction industry. The materials can be of any size and shape (e.g., a thin millimeter (1 to 20 mm) layer on a surface of a battery compartment, a thick (10 cm to 1 m) block used in engine compartments for fire retardancy, etc.).

Definitions

As used herein, "fire-resistant" refers to a material that resists burning and withstands heat. For the purposes of this application, fire-resistant is a material that cannot be ignited or does not ignite and does not drip molten material (flaming or not flaming) when subject to testing conditions as specified in the standard test methods published by Underwriters Laboratories (UL) 94 HB (Standard for Safety of Flammability of Plastic Materials for Parts in Devices and Appliances testing), and by American Society of Testing Materials (ASTM) E1354 (Standard Test Method for Heat and Visible Smoke Release Rates for Materials and Products Using an Oxygen Consumption calorimeter). As used herein, "fire retardant" refers to materials that help prevent fires from starting and/or limit their spread. For the purposes of this application, fire-retardant materials do ignite under the conditions reported by UL 94 VB and HB and ASTM E1354, yet can be classified as fire-retardant retardant materials, for example UL 94 HB, or UL 94 V1, or Class A, B, or C materials as defined by National Fire Protection Agency (NFPA) 101® Life Safety Code®. Other descriptors that are applied to the composite materials disclosed herein are, for example, "flame resistant", "limited-combustible materials" "flame retardant", and the like.

As used herein, a "thermally insulating" material is a solid material whose thermal conductivity (for example measured with a heat flow meter) is below 0.2 $W \cdot m^{-1} \cdot K^{-1}$ at ambient temperature and pressure.

An open cell foam is a type of foam with cells or pores that are not completely sealed. The pores or cells can be filled with gas or liquid and the gas or liquid filling the pores or cells can be replaced by another gas or liquid. Replacement can be carried out, for example, by placing the foam in a vessel containing excess of a second gas or liquid miscible with the gas or liquid originally contained inside the pores, or by pulling a vacuum to pump out the initial gas or liquid, and filling the empty foam with a second gas or liquid.

As used herein, a phase change material (PCM) is a material that utilizes latent heat of fusion for thermal storage at its melting/freezing point. During solid-liquid phase transitions, phase change materials absorb large amounts of heat energy without a change in temperature. Based on this unique property, phase change materials can be incorporated into materials to assist in maintaining the temperature of the material and/or structures that are encased or surrounded by or adjacent to the PCM-containing composite material when exposed to excessive heat and/or fire.

As used herein, a "foam" is a material comprising trapped pockets of gas (cells or pores; the gas may simply be air). A foam can be a liquid or solid. Particular examples described herein are typically solid (rigid). An "open cell foam" comprises cells that are not completely encapsulated. By contrast, closed cell foam is made up of cells that are encapsulated (enclosed). The open cell foam has a network of cells or pores which extends from the surface through at least a portion of the interior of the foam, and preferably all of the foam. The cells or pores on the interior are interconnected with cells or pores on the surface of the foam, such that when solvent carrying the PCM is applied to the foam, the solvent can carry the PCM throughout pores of the foam and have PCM precipitated into cells or pores throughout the foam on, for example, walls of at least some and possibly all of the cells or pores, including both internal pores or cells and surface pores or cells.

As used herein, "monolithic" means formed of a single, solid block. In some applications, the open cell foam with PCM distributed throughout is monolithic in character.
Exemplary Materials The materials disclosed herein are composite materials comprising at least the following two materials: 1) at least one porous, open cell foam material and 2) at least one PCM.
Porous Open Cell Foam Materials The porous materials utilized to make the disclosed compositions are typically open cell foams having a plurality of pores or cells. Examples of suitable porous materials are open cell aerogels such as, but not limited to an aerogel with a skeleton consisting of silica or other oxides or carbon. The open cell foam may also comprise combinations of an oxide and an organic component, such as silica-phenolic aerogels, or silica aerogels reinforced or cross-linked with polyurethanes or polyurea. Other examples of open cell foams are floral foams (such as phenolic foams used for flower displays), noise damping, soundproofing and sound absorbing foams (which can be made, for example, of polyurethane, polyimide, fiberglass, melamine, polypropylene, and composites thereof), and other foams that are commonly utilized in construction materials, such as (but not limited to) polyurethane, polyisocyanurate, polyimide and polystyrene foams. In the practice of the invention, the foams are compatible (that is, not dissolved) with the solvent used for infiltration or distribution of the solvent/PCM mixture throughout the network of interconnected pores or cells of the foam. Generally, the average pore size (diameter) in a suitable material ranges from about 2 nm to about 1 mm, such as about 2, 5, 10, 15, 20, 25, 30, 35, 40, 45 or 50 nm.

In some aspects, the porous material is an aerogel. As used herein "aerogel" refers to a solid material of extremely low density, generally produced by removing the liquid component from a conventional gel. Aerogels are a class of synthetic porous ultralight material derived from a gel, in which the liquid component for the gel has been replaced with a gas, without significant collapse of the gel structure. The result is a solid with extremely low density and extremely low thermal conductivity.

The aerogel may be comprised of at least one of a variety of materials or combinations of materials, including but not limited to: resorcinol-formaldehyde, silica, carbon, metal oxide, agar, cellulose, polyimide, chalcogens (e.g. S, Se, etc.), calcium selenide, pectin, resorcinol-formaldehyde and other phenolic polymers, polyurethane, polyicosyanurate, phenolic, polyisocyanurate, polyurethane, polystyrene, polyimide, pectin, cellulose, polyurethane, lignin, chitosan, and to combinations of an oxide and an organic component, such as silica-phenolic aerogels, or silica aerogels reinforced or cross-linked with polyurethanes or polyurea.
Phase Change Materials (PCMs)

The materials disclosed herein comprise a porous, open cell material with a phase change material (PCM) positioned within the plurality of pores (cells) of the porous material. The choice of PCM will depend on the operating temperature of the composite, and of the materials that the PCM/foam composite is designed to protect. The PCMs are preferably inorganic materials, and most preferably hydrated inorganic materials. Particular examples of inorganic PCMs that are suitable for inclusion in the pores or cells include but are not limited to: hydrated $MgSO_4$, $MgCl_2$, $Fe_2SO_4$, $Na_2SO_4$, $CaCl_2$, $FeCl_2$, $Na_2HPO_4$, and the many other examples reported in the literature. A comprehensive but not exhaustive list of inorganic PCM in Table 2 of Renewable and Sustainable Energy Reviews 122 (2020) 109727, at doi.org/10.1016/j.rser.2020.109727. Examples of hydrated inorganic materials useful as the PCMs in the composite materials include but are not limited to $CaCl_2 \cdot 6H_2O$, $MgCl_2 \cdot 6H_2O$, $FeCl_2 \cdot 6H_2O$, $Na_2HPO_4 \cdot 12H_2O$, $Na_2SO_4 \cdot 10H_2O$, $Ba(OH)_2 \cdot 8H_2O$, etc. An advantage of the hydrated inorganic materials is that the when the inorganic portion of the PCM absorbs heat energy from fire or thermal exposure, the water is freed or otherwise released and provides for additional cooling on evaporation as well as additional fire retardancy or fire resistance.

The PCMs are preferably dissolvable or dispersible in a suitable solvent. In some aspects, an inorganic PCM salt is used, such as $MgSO_4$, $MgCl_2$ or $Na_2SO_4$, or another common inorganic PCM, as described above, and the solvent may be water.

The concentration of the PCM in the exchange solution can vary from 1% by weight up to the saturation concentration of the PCM. For example, the concentration of PCM can generally be in the range of from about 1 g per 100 mL of water to about 27 g per 100 mL at room temperature. This concentration can be increased to up to 70 g per 100 mL by heating the water to 70° C.

The PCMs are located or disposed within (infiltrated into) the pores or cells of the porous, open cell material. By "located within" or "disposed within" or "infiltrated into" the pores or cells, it is meant that the PCM fills or at least partially fills a majority of the pores or cells, e.g., by precipitating on or otherwise distributed on the walls of the pores or cells. Generally, at least about 5, 10, 25, 30, 35, 40, 45, 50, 55, 60, 65, 70, 75, 80, 85, 90, 95 or even 100% of the pores or cells contain at least some PCM. In some aspects, at least about 50, 55, 60, 65, 70, 75, 80, 85, 90, 95 or even 100% of the pores or cells contain at least some PCM. In further aspects, at least about 75, 80, 85, 90, 95 or even 100% of the pores contain at least some PCM.

Figure 4A:
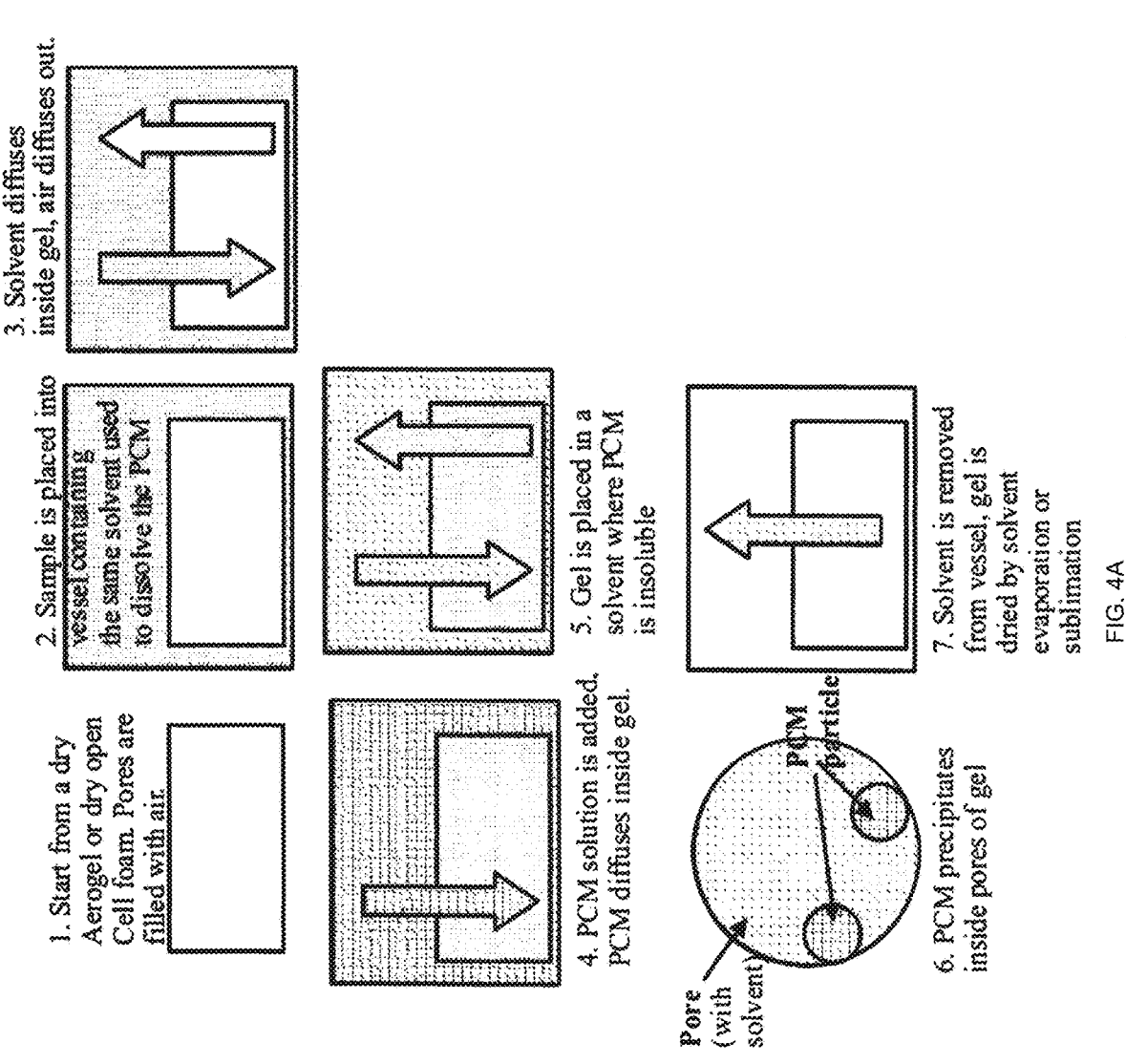
FIG. 4A-B are schematics illustrating an exemplary pathway for manufacturing composite aerogel PCM materials from a synthesized areogel (A) and from a a process wherein the aerogel is first synthesized before combining with PCM (B).
Figure 4B:
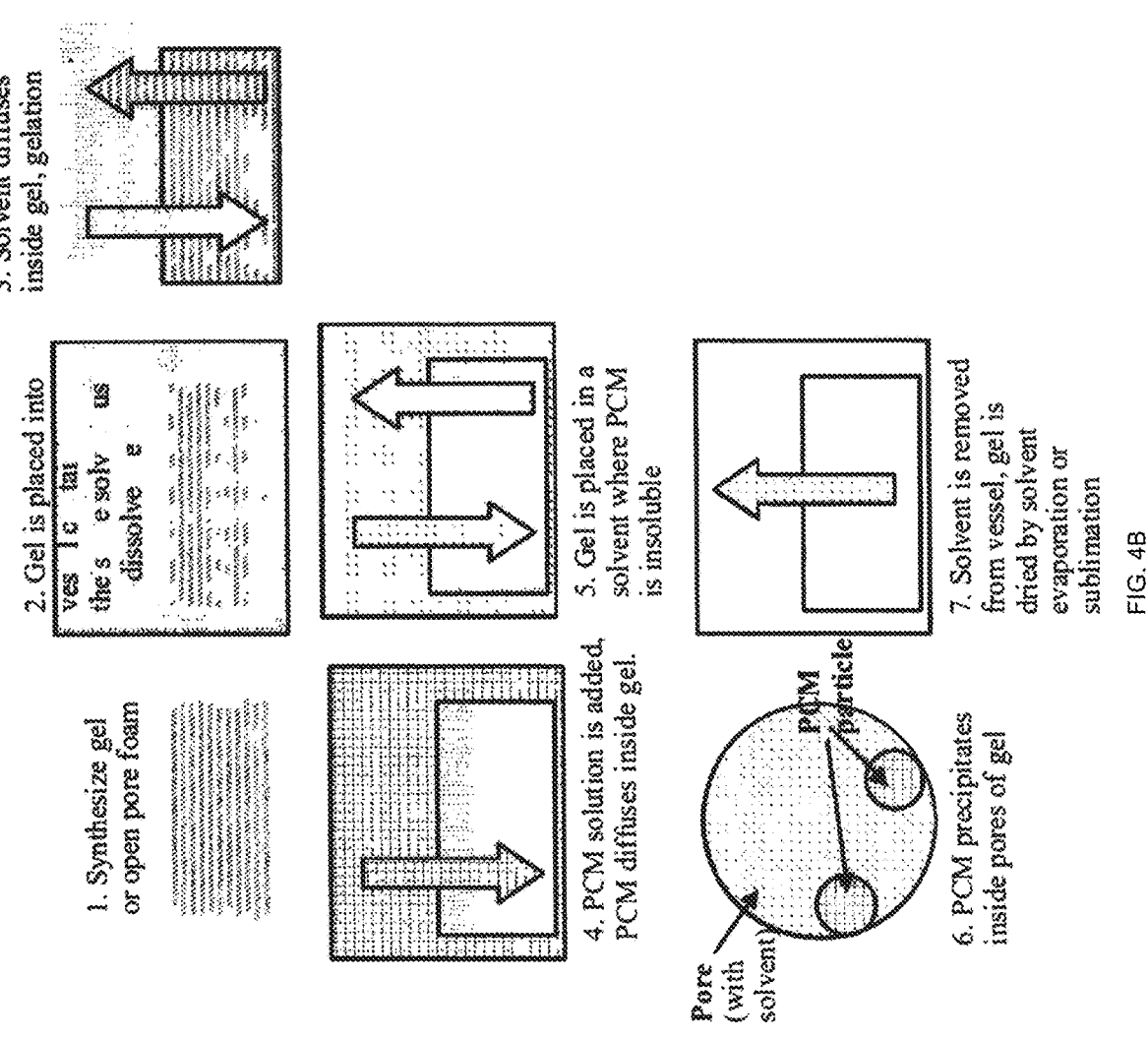
Figure 5A:
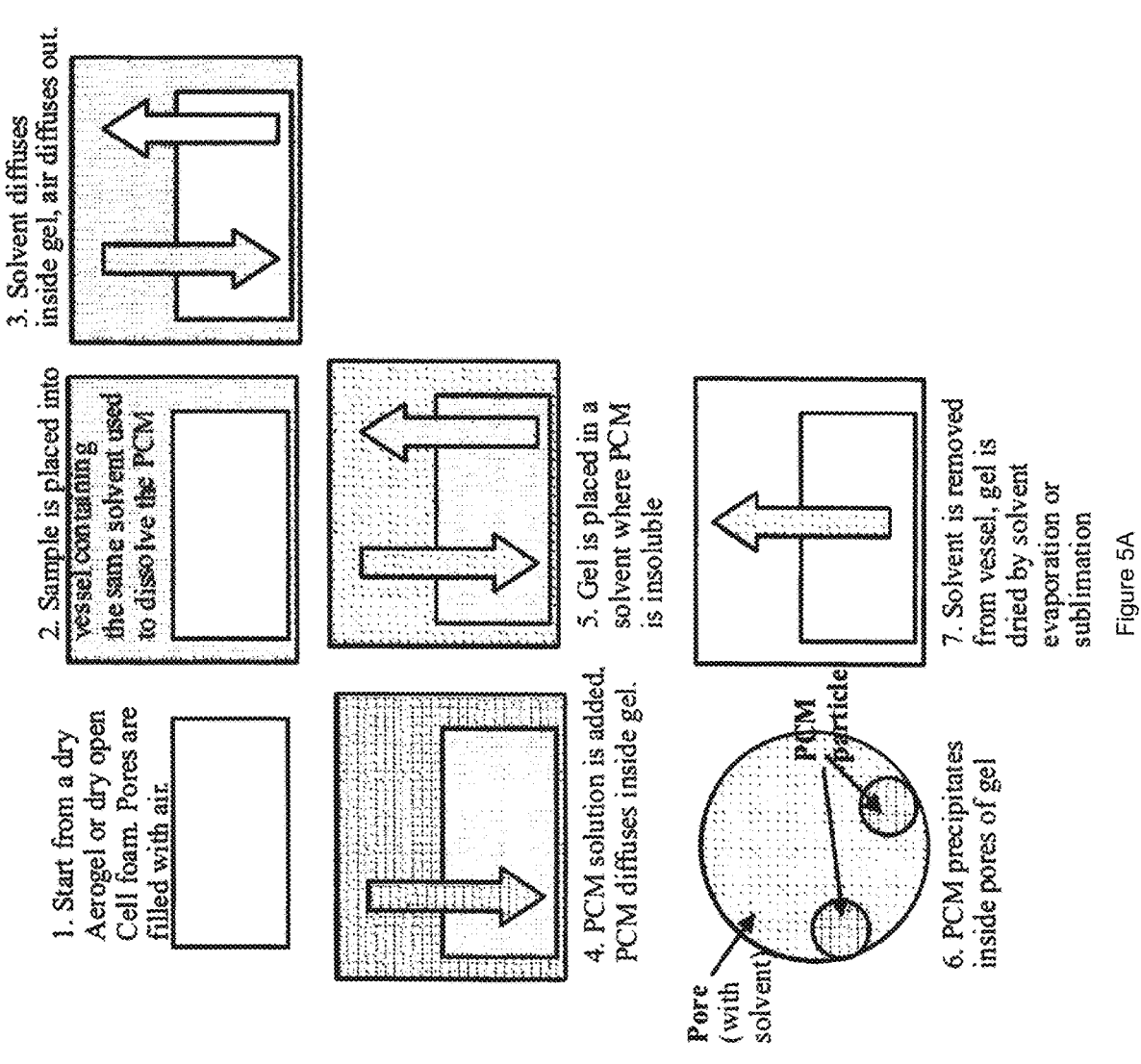

FIGS. 4a and 4b illustrates exemplary processes for producing the composite materials of the invention.

1. In FIG. 4a, the aerogel is solid open cell foam wherein the pores or cells are filled with air (however, other gases (e.g., nitrogen or carbon dioxide) may be present in the pores or cells). The aerogel can have any desired size or shape. In FIG. 4b, the aerogel is first synthesized and can be a solid or a gel. For example, the porous foam material can be a "wet" gel, that is, a gel prepared for example by sol-gel hydrolysis/condensation and still containing the gelation solvent. Alternatively, the porous material can be a foam, such as the open cell foams described above.

2. In both FIGS. 4a and 4b, the foam or gel is submerged in or otherwise placed in contact with (e.g., sprayed, drenched, etc.) the solvent used to dissolve or disperse the PCM. In some embodiments the solvent dissolves the PCM and in other embodiments the solvent disperses the PCM throughout the solvent. The solvent; however, should not dissolve the foam or gel.

3. The solvent diffuses inside the pores of the foam, and it displaced the gelation solvent as in FIG. 4b, or the air of a pre-fabricated foam, as shown in FIG. 4a.

4. The solvent is then removed from the vessel, and replaced with the PCM solution (i.e., PCM and solvent) with the desired PCM concentration. The PCM solution will diffuse and be distributed within the network of cells or pores, extending from the surface pores or cells to the interior pores or cells. Diffusion can be aided by applying pressure or drawing a vacuum. In this way the PCMs are located or disposed within (infiltrated into) the pores of the porous, open cell material. By "located within" or "disposed within" or "infiltrated into" the pores or cells we mean that the PCM fills or at least partially fills a majority of the pores, e.g., by precipitating on and possibly adhering to the walls of the pores or cells. Generally, at least about 25, 30, 35, 40, 45, 50, 55, 60, 65, 70, 75, 80, 85, 90, 95 or even 100% of the pores contain at least some PCM. In some aspects, at least about 50, 55, 60, 65, 70, 75, 80, 85, 90, 95 or even 100% of the pores contain at least some PCM. In further aspects, at least about 75, 80, 85, 90, 95 or even 100% of the pores or cells contain at least some PCM. Further, each individual pore or cell is generally at least about 1, 5, 10, 15, 25, 30, 35, 40, 45, 50, 55, 60, 65, 70, 75, 80, 85, 90, 95 or even 100% filled, and in preferred embodiments each pore or cell is usually is about 1-25%, e.g., 1, 5, 10, 15, 20, 25%. Step 3 of FIG. 4b shows a variation where the gelation solvent is displaced from the gel by the PCM/solvent mixture.

Item 4 of FIGS. 4a and 4b highlights that the PCM diffuses inside the gel or foam when the PCM/solvent solution and gel or foam are brought together. The diffusion can be by movement of the PCM/solvent combination from open cells or pores on the exterior surfaces of the foam or gel, and through an interconnected network of open cells or pores into the interior of the foam or gel.

5. The foam is then placed into a container filled with a solvent where the PCM is insoluble. Alternatively, the PCM solution is removed, and a solvent added to the container of Item 4. When the "new" solvent, where the PCM is insoluble, diffuses throught the pores, the PCM particles precipitate inside the pores or cells of the foam as shown in Item 6 of FIGS. 4a and 4b. The PCM particles in most applications will be present on the walls of a large percentage, a majority, or even all of the cells or pores of the foam (as noted above generally 25-100% of the pores or cells), and the PCM particles will generally partially fill the pores or cells (as noted above, generally 1-25% full).

7. The last step of the process is highlighted in item 7 of FIGS. 4a and 4b. Here, the solvent of the PCM/Solvent mixture or dispersion is removed from the foam to leave the composite of the open cell foam with cell walls of interior and exterior cells or pores having coated, precipitated, or otherwise deposited thereon PCM particles. This may be accomplished by evaporation or sublimation of the solvent from the container or by other suitable means. This process can be assisted by the use of vacuum pressure, heat, etc.

Other (Optional) Components

In some embodiments, other materials are added in order to modify the properties of the composite materials, e.g. to increase strength, heat/fire resistance, to make the materials more hydrophobic, or more hydrophilic, or to increase their optical density, including optical density in the infrared, or to increase or decrease electric conductivity. For example, loose fiberglass or other filler materials may be added to the aerogel precursor solution or mixed to the already-poured aerogel precursor solution before gelation occurs. Other examples of fillers include but are not limited to wood flour, cellulose fibers, metal nanoparticles or metal fibers, carbon fibers, graphene, glass microspheres, polyimide fibers, carbon black, and graphite. Alternatively, these filler or other materials may be added to the PCM/solvent composition and the fillers could be deposited on the walls of the open cell foam in the same way as the PCM.

Aerogels are typically made by carrying out a polymerization reaction of a monomer or monomers dissolved in low concentration in a solvent (called the "gelation solvent") to form a gel. In most cases, the gelation solvent is removed from the gel by submerging the gel in excess of another solvent in which the gelation solvent is soluble. This second solvent is then removed from the gel, leaving behind a solid scaffolding comprising pores separated by pore walls. In other cases, the liquid that is removed and replaced with a solvent or a series of solvents via solvent exchange. In some aspects, the curing solvent can be 2-propanol, or toluene, and the curing temperature can be room temperature or any temperature between room temperature and the boiling temperature of the curing solvent. Preferably, the residual ethanol concentration is <1%, but higher concentrations are possible, e.g., from about 1-50%, such as about 1, 5, 10, 156, 20, 25, 30, 35, 40, 45, or about 50%. Similarly, should a solvent different from ethanol be used for the cure, this solvent is typically replaced with water to reach a solvent concentration <1%, such as less than about 50, 45, 40, 35, 30, 25, 20, 15, 10, 5% or less, e.g., 5, 4, 3, 2, or 1% or less. The aerogel may be dried before a final substance of interest (such as a liquid PCM or PCM/solvent mixture or dispersion) is introduced into the pores; or a liquid of interest (such as a PCM/solvent mixture or dispersion) can be introduced into the pores by solvent exchange with the last solvent in the series (e.g., the gelation solvent of the gelatinous aerogel can be displaced by the PCM/solvent mixture or dispersion). In some embodiments, the solvent of the PCM/solvent mixture or dispersion is exchanged with a solvent compatible with a drying solvent. If camphene is used, and the PCM solution is aqueous, one often will carry out one or more exchanges, for example, water to ethanol, ethanol to acetone, and acetone to camphene. If the drying solvent melts at temperatures above room temperature, the samples would be kept in an oven to maintain the organic solvent in its liquid state during solvent exchange. For example, for drying in camphene one would have to keep the sample above 50° C. After solvent exchange, one would cool the sample to below the melting temperature of the solvent and pass dry air or nitrogen onto the sample to sublime and thus remove the solid solvent, leaving behind the PCM. The resulting aerogel is typically highly porous, has a very low density and is solid to the touch. In another embodiment, a solvent with low surface energy, such as acetone, or pentane, can be used instead of camphene. Drying may be accomplished by slow evaporation of the solvent at ambient temperature.

The synthesis of an exemplary polymeric aerogel is described in Example 1. In that Example, the aerogel is synthesized by reacting resorcinol (R), formaldehyde (37% water solution, F), a catalyst (aminopropyltrimethoxysilane, APTMS) in ethanol. Depending on the desired constitution of the aerogel, different aerogel precursors from resorcinol and formaldehyde may be used.

As another alternative, one would synthesize the gel as described above. After synthesis, one would exchange the solvent with ethanol to remove the water from the synthesis, and then acetone. One would then exchange the acetone with a solution of an organic PCM (such as a long-chain wax) dissolved in an organic solvent. Drying would proceed as illustrated above, after exchanging the PCM solution with a solvent in which the PCM is not soluble.

In further aspects, a gel-forming precursor solution is placed inside a paper, aramid, aluminum or polymeric (e.g., polyethylene) mold, such as a honeycomb mold. The gel precursors are poured into the mold, and processing proceeds as indicated earlier. If paper honeycombs are used, it is recommended to soak them in the gelation solvent (e.g., ethanol) to prevent the dry paper from absorbing liquids during the gelation process. The surfaces of the honeycombs can also be coated with a chemical that will adhere to the honeycomb but also participate into the gelation reaction. For example, a phenolic epoxy could be employed for this derivatization process. An example of aramid honeycomb with cell cores filled with aerogel-PCM composite is described in the Examples. In another alternative aspect, a mat of fiberglass can be placed at the bottom of a mold. The gel precursor solution is then poured on top of the fiberglass mat, which becomes incorporated into the composite.

In some aspects, if the starting foam is insufficiently rigid (mechanically weak), the starting solvent can be exchanged with acetone or another solvent with low surface energy (to reduce the capillary forces), or the solvent can be freeze dried or supercritically dried. Either way, the PCM precipitates inside the pores of the original foam and yields a material that is thermally insulating (via the foam) and is also capable of absorbing energy (via the PCM). If a fire-retardant foam were initially chosen, and the PCM is an inorganic salt, the foam/PCM composite is fireproof or fire retardant and/or thermally insulating due to the energy absorption by the PCM.

Applications and Uses of the Technology

Applications of the technology disclosed herein include but are not limited to: producing wall insulation boards, fireproof claddings for steel structures, inner cores of fire resistant wall or door panels, and the like. Exemplary applications are discussed below.

Prevention of runaway events in battery packs. High-voltage EV batteries use electrical insulation materials to protect against unwanted and unsafe electrical arcing. With the increasing use of batteries, especially lithium-ion batteries, prevention of runaway events (where one battery overheating causes the whole pack to overheat and possibly catch fire or explode), materials capable of insulating and absorbing energy, such as those disclosed herein, are highly relevant. The materials disclosed herein as suited to be used as specialty die-cut electrical insulation components used inside and around an EV battery pack, since they can be cut-to-shape, are lightweight, and afford excellent heat absorption. When in place in a battery pack, the materials at least: prevent short circuits between positive and negative electrodes; prevent electrical contact between electrodes and current collectors; prevent contact with other cells or components; protect against mechanical damage; prevent electrical contact with cooling system; and prevent electrical contact with battery management system connections. For battery thermal runaway protection, the Examples demonstrate that a composite material comprising a thermally insulating material, such as an aerogel, and a Phase Change Material (PCM) is excellent for preventing battery thermal runaway. The thermal insulator slows down the heat propagation from the trigger to the surrounding batteries, while the PCM absorbs part of the heat generated by the trigger battery.

Protection of ordnance, in ships, tanks and other closed spaces. The Russian cruiser "Moskva" likely sank because the ordnance stored in the silos in the upper decks caught fire and exploded following the first hit by a Ukrainian missile. This and similar occurrences could be avoided or at least mitigated by installation of the fire-retardant materials provided herein.

Protection of sensitive parts of ships and buildings from fire. The materials disclosed herein couple thermal insulation with heat absorption and can prevent or significantly delay damage to structures and machinery.

The PCM-containing materials disclosed herein are used in any application where fire retardant, fire resistant, preferably monolithic, thermal insulation is needed. Examples include but are not limited to: in the automotive industry (e.g., for the thermal insulation of electric cars, where air conditioning and heating shorten attainable mileage and battery lifetime); and in the aerospace industry (e.g., especially for airplane and rocket fireproofing); and the like.

It is to be understood that this invention is not limited to particular embodiments or aspects described, as such may, of course, vary. It is also to be understood that the terminology used herein is for the purpose of describing particular embodiments or aspects only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments or aspects described and illustrated herein has discrete components and features which may be readily separated from or combined with the features of any of the other several embodiments or aspects without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLES

Example 1

Polymeric aerogels were synthesized by reacting resorcinol (R), formaldehyde (37% water solution, F), a catalyst (aminopropyltrimethoxysilane, APTMS) in ethanol. The concentrations are reported in Table 1.

TABLE 1

| Precursors and concentrations used in a typical synthesis | | | | |
|---|---|---|---|---|
| Reagent | Resorcinol | 37% formaldehyde water solution | APTMS | Ethanol |
| Concentration (Mol/l) | 0.911 mol/L | 0.200 mL formalin/mL solution OR Approx. 2.236 mol/L of actual formaldehyde | 0.115 mol/L | 0.701 mL ethanol/mL solution |

The precursors listed in Table 1 were mixed and rapidly poured into a mold (Teflon or high-density polyethylene). The mold was hermetically sealed with paraffin or a plastic sheet. Gelation occurred within 30 to 40-minutes. The gel was extruded into a container filled with 3× the gel volume of ethanol, sealed, and left to cure for another 12 to 24-hr. at a temperature of 65° C.

It was important that during curing, the mold was kept hermetically sealed to prevent solvent evaporation. During curing time, unreacted precursors, reaction byproducts and oligomers not bound to the pore walls diffuse outside the cell. The ethanol was then decanted and replaced with water. The water was typically 10× the gel volume, and exchanges were repeated 2 times to remove most of the ethanol filling the pores of the gel.

In this example, the PCM was $MgSO_4$ in an aqueous solution with a concentration of 30% PCM by weight. After exchanging with the PCM solution, the gel was placed in 3× the gel's volume of ethanol for 2 exchanges, then in 3× the gel's volume of acetone for 3 exchanges. During all these stages, the gel was and must be kept inside a hermetically sealed container to prevent solvent evaporation. Once acetone exchange is complete, the gel was removed from solvent and covered with a plastic sheet. In an alternative embodiment, the gel is placed in a polyethylene bag, only partially sealed, or in a container, sealed with a plastic or paraffin film, where holes have been pierced. A key to drying is the slow evaporation of the pore-filling solvent, therefore the examples just presented are not to be considered exhaustive. In this step, the sheet was not hermetically sealed, allowing for slow evaporation of the acetone. The gel was then allowed to air dry at ambient temperature and pressure, typically for 24 hours until all acetone had evaporated out of the gel's pores.

It is noted that the ethanol exchanges force precipitation of the PCM inside the pores of the gel. Acetone is used as drying solvent. Since water and acetone are poorly soluble, one needs to first exchange the water with a solvent that is soluble in acetone, such as ethanol. As exchange solvent one could use isopropanol, or any other solvent that is miscible with both water and acetone.

Figure 2B:
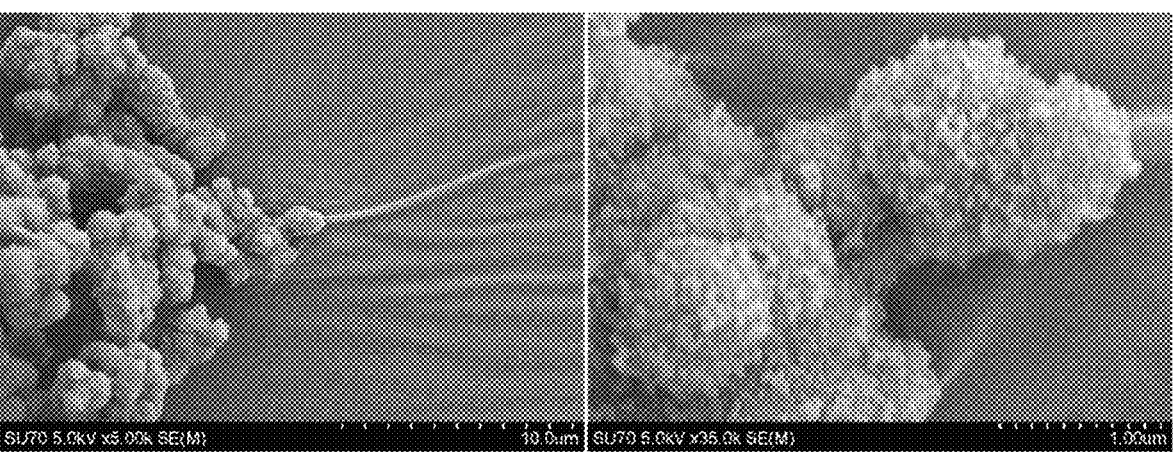
Figure 3:
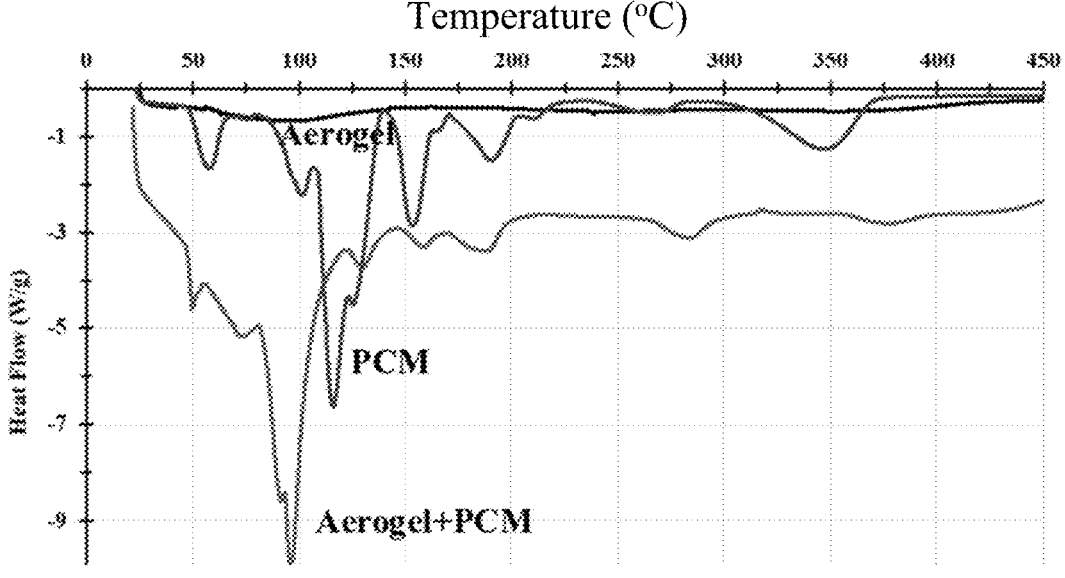
FIG. 3. Differential scanning calorimetry (DSC) of aerogel, aerogel+PCM and pure PCM, as indicated. PCM was $MgSO_4$ $7H_2O$.

The physical properties of the resulting materials are reported in Table 2. The morphology of the composites was investigated by Scanning Electron microscopy (SEM). SEM of aerogels formed without addition of PCMs is shown in FIG. 1. We note a sphere-like morphology of the polymeric aggregates constituting the back-bone of the gel. FIG. 2 shows SEM of aerogel-PCM composites. The spherical morphology is maintained after PCM exchange and drying", indicating that addition of the PCM does not alter the microstructure of the aerogels. The spheres, however, appear to have a rough surface, indicating that the PCM nucleates on the surfaces of the polymer spheres. Differential Scanning calorimetry (DSC) of the aerogel-PCM composites was conducted and the results are shown in FIG. 3.

As can be seen, several peaks are present. These can be reconciled to energetic levels of water molecules bound to the PCM. The peaks are shifted towards lower temperatures when compared to pure PCM, indicating a weaker adsorption of water to the metal salt. Integration of the area under the peaks yields an enthalpy of 350 J/g of the composite. Considering that the PCM content of the sites was of around 30%, the enthalpy of fusion compares well to the enthalpy of pure PCM (1250 J/g).

TABLE 2

| Physical properties of aerogel-PCM composites. | | | |
|---|---|---|---|
| | Density (g/cm$^3$) | Surface Area (m$^2$/g) | Thermal conductivity (W/mK) |
| Aerogel | Approx. 0.1 | 5.119 | 0.03789 |
| Aerogel + PCM | Approx. 0.2-0.3 | 1.807 | 0.04535 |
| Aerogel + PCM + Honeycomb | Approx. 0.3 | — | 0.08118 |

The Aerogel-PCM synthesized as described herein was fireproof. ASTM E 1354 cone calorimetry tests were carried out and it was found that the Aerogel-PCM composites did not ignite even when exposed to a radiant power of 100 kW/m$^2$, which is the highest power recommended by ASTM for this type of test. Fume release by the composites was below the IDLH (Immediately Dangerous to Life and Health) limits from NIOSH (1994 and 2014). An IDLH table is shown in Table 3 and values for aerogel-PCM composites (collected according to ISO 21397) are reported in Table 4.

TABLE 3

IDLH concentrations for gases typically released by the combustion of construction materials.

| Component | Composition |
| --- | --- |
| Carbon monoxide | 1200 |
| Carbon dioxide | 40000 |
| Hydrogen cyanide | 50 |
| Sulfur dioxide | 100 |
| Hydrogen chloride | 50 |
| Hydrogen fluoride | 30 |
| Hydrogen bromide | 30 |
| Acrolein | 2 |
| Formaldehyde | 20 |
| Nitric oxide | 100 |
| Nitrogen dioxide | 20 |
| Ammonia | 300 |

TABLE 4

Concentration of gases released by Aerogel-PCM composites during cone calorimetry tests.

| Gas | | Units | Specimen 1 | Specimen 2 | Specimen 3 | Average |
| --- | --- | --- | --- | --- | --- | --- |
| CO | $\Phi$ | — | 358.693 | 281.906 | 355.928 | 332.176 |
| | $\Sigma$ yield | ppm | 0.208 | 0.211 | 0.255 | 0.224 |
| $CO_2$ | $\Phi$ | — | 1119.110 | 944.467 | 1058.094 | 1040.556 |
| | $\Sigma$ yield | ppm | 0.789 | 0.921 | 0.627 | 0.779 |
| HCN | $\Phi$ | — | 4.407 | 3.840 | 5.831 | 4.693 |
| | $\Sigma$ yield | ppm | 0.002 | 0.002 | 0.003 | 0.002 |
| $SO_2$ | $\Phi$ | — | <DL | <DL | <DL | <DL |
| | $\Sigma$ yield | ppm | <DL | <DL | <DL | <DL |
| HCl | $\Phi$ | — | <DL | <DL | <DL | <DL |
| | $\Sigma$ yield | ppm | <DL | <DL | <DL | <DL |
| HF | $\Phi$ | — | <DL | <DL | <DL | <DL |
| | $\Sigma$ yield | ppm | <DL | <DL | <DL | <DL |
| HBr | $\Phi$ | — | <DL | <DL | <DL | <DL |
| | $\Sigma$ yield | ppm | <DL | <DL | <DL | <DL |
| Acrolein | $\Phi$ | — | <DL | <DL | <DL | <DL |
| | $\Sigma$ yield | ppm | <DL | <DL | <DL | <DL |
| Formaldehyde | $\Phi$ | — | 0.947 | 0.961 | 0.940 | 0.949 |
| | $\Sigma$ yield | ppm | 0.000 | 0.000 | 0.000 | 0.000 |
| NO | $\Phi$ | — | <DL | <DL | <DL | <DL |
| | $\Sigma$ yield | ppm | <DL | <DL | <DL | <DL |
| $NO_2$ | $\Phi$ | — | <DL | <DL | <DL | <DL |
| | $\Sigma$ yield | ppm | <DL | <DL | <DL | <DL |
| Ammonia | $\Phi$ | — | 78.23 | 72.515 | 117.869 | 89.769 |
| | $\Sigma$ yield | ppm | 0.021 | 0.018 | 0.035 | 0.025 |

Note:
Exhaust volume flow rate assumed to be a constant 2.40 $m^3$/s
$\Phi$—concentration
DL—below detection limit While the invention has been described in terms of its several exemplary embodiments, those skilled in the art will recognize that the invention can be practiced with modification within the spirit and scope of the appended claims. Accordingly, the present invention should not be limited to the embodiments as described above but should further include all modifications and equivalents thereof within the spirit and scope of the description provided herein.

We claim:

1. A method of making a material, comprising:
 i) providing, using a sol-gel process using a gelation solvent, an open cell foam comprising a network of open pores or cells with at least some interior pores or cells in the network being accessible by a gas or liquid through at least some surface pores or cells in the network, wherein the sol-gel process is performed such that the gelation solvent remains in at least some of the open pores or cells;
 wherein the at least some interior pores or cells are within an interior portion of the open cell foam and the at least some surface pores or cells are positioned at one or more external surfaces of the open cell foam, and the at least some interior pores or cells and the at least some surface pores or cells comprise pore or cell walls defining a pore or cell;
 ii) exchanging, by solvent exchange, the gelation solvent with a miscible solvent or solvent mixture in which one or more phase change materials (PCMs) are soluble;
 iii) exchanging, by solvent exchange, the miscible solvent or solvent mixture with a miscible solvent or solvent mixture comprising the one or more PCMs such that the one or more PCMs infiltrate the at least some of the open pores or cells;
 iv) exchanging, by solvent exchange, the solvent or solvent mixture comprising the one or more PCMs with a solvent or solvent mixture in which the one or more PCMs are not soluble such that the one or more PCMs are deposited in or adjacent to at least some portions of at least some of the pore or cell walls of both the at least some surface pores or cells and the at least some interior pores or cells;
 v) exchanging, by solvent exchange, the solvent or solvent mixture in which the one or more PCMs are not soluble with a drying solvent; and
 vi) removing the drying solvent from the open cell foam by evaporation at ambient temperature and pressure so as to leave the one or more PCMs deposited on or adjacent to the at least portions of the pore or cell walls of a plurality of pores or cells of the network;

wherein the one or more PCMs is or are hydrated inorganic materials and is or are deposited in 50-100% of the at least some surface pores or cells and the at least some interior pores or cells in the network, and wherein the one or more PCMs fills 1-25% of a volume of either or both of the at least some surface pores or cells and the at least some interior pores or cells.

2. The method of claim 1, wherein the open cell foam is an aerogel.

3. The method of claim 1, wherein the open cell foam is a rigid open cell foam.

4. The method of claim 1, wherein a size of the open pores or cells ranges from 100 nm-1 mm.

* * * * *